(12) United States Patent
Rubakha et al.

(10) Patent No.: US 10,546,131 B2
(45) Date of Patent: Jan. 28, 2020

(54) END-POINT VISIBILITY

(71) Applicant: McAfee, LLC, Santa Clara, CA (US)

(72) Inventors: Dmitri Rubakha, Santa Clara, CA (US); Francisco M. Cuenca-Acuna, Cordoba (AR); Hector R. Juarez, Cordoba (AR); Leandro I. Costantino, Villa Carlos Paz (AR)

(73) Assignee: McAfee, LLC, Santa Clara, CA (US)

( * ) Notice: Subject to any disclaimer, the term of this patent is extended or adjusted under 35 U.S.C. 154(b) by 194 days.

(21) Appl. No.: 15/089,021

(22) Filed: Apr. 1, 2016

(65) Prior Publication Data

US 2017/0116420 A1    Apr. 27, 2017

Related U.S. Application Data

(60) Provisional application No. 62/245,139, filed on Oct. 22, 2015.

(51) Int. Cl.
*G06F 21/57* (2013.01)
*G06F 21/56* (2013.01)

(52) U.S. Cl.
CPC .......... *G06F 21/575* (2013.01); *G06F 21/568* (2013.01); *G06F 2221/034* (2013.01)

(58) Field of Classification Search
CPC ........ G06F 21/57; G06F 21/575; G06F 21/56; H04L 63/14
USPC ...................................... 726/22–24; 713/2–5
See application file for complete search history.

(56) References Cited

U.S. PATENT DOCUMENTS

| | | | | |
|---|---|---|---|---|
| 7,591,018 B1 * | 9/2009 | Lee | ........................ | G06F 21/567 726/24 |
| 8,225,394 B2 * | 7/2012 | Gassoway | ............... | G06F 21/56 713/188 |
| 8,448,165 B1 * | 5/2013 | Conover | ............. | G06F 9/45558 717/174 |
| 8,495,741 B1 * | 7/2013 | Naftel | .................... | G06F 21/575 713/165 |
| 8,813,222 B1 * | 8/2014 | Codreanu | ............... | G06F 21/56 726/22 |
| 9,009,819 B1 * | 4/2015 | Savant | .................... | G06F 21/57 726/22 |
| 9,330,260 B1 * | 5/2016 | Guo | ....................... | G06F 21/566 |

(Continued)

OTHER PUBLICATIONS

International Search Report and Written Opinion received for PCT Patent Application No. PCT/US2016/052586, dated Dec. 16, 2016; 12 pages.

(Continued)

*Primary Examiner* — Lynn D Feild
*Assistant Examiner* — Viral S Lakhia
(74) *Attorney, Agent, or Firm* — Byrne Poh LLP

(57) ABSTRACT

A system for securing electronic devices includes a processor, a storage medium communicatively coupled to the processor, and a monitoring application comprising computer-executable instructions on the medium. The instructions are readable by the processor. The monitoring application is configured to receive an indication that a client has been affected by malware, cause the client to boot from a trusted operating system image, cause a launch of a secured security application on the client from a trusted application image, and analyze a malware status of the client through the secured security application.

17 Claims, 5 Drawing Sheets

(56) References Cited

U.S. PATENT DOCUMENTS

| | | | | |
|---|---|---|---|---|
| 9,495,188 B1* | 11/2016 | Ettema | ................ | G06F 9/45533 |
| 9,626,205 B2* | 4/2017 | Yu | ....................... | G06F 9/45541 |
| 9,882,929 B1* | 1/2018 | Ettema | ................. | H04L 63/145 |
| 2005/0015606 A1* | 1/2005 | Blamires | ............... | G06F 21/575 |
| | | | | 713/188 |
| 2010/0269156 A1* | 10/2010 | Hohlfeld | ............ | G06F 21/6218 |
| | | | | 726/4 |
| 2011/0078796 A1* | 3/2011 | Khilnani | ............... | G06F 21/567 |
| | | | | 726/24 |
| 2011/0113231 A1* | 5/2011 | Kaminsky | ............. | G06F 21/575 |
| | | | | 713/2 |
| 2012/0131675 A1* | 5/2012 | Dai | ........................ | G06F 21/56 |
| | | | | 726/24 |
| 2012/0255017 A1* | 10/2012 | Sallam | ................. | G06F 21/575 |
| | | | | 726/24 |
| 2014/0101426 A1* | 4/2014 | Senthurpandi | .......... | G06F 21/32 |
| | | | | 713/2 |
| 2014/0215621 A1* | 7/2014 | Xaypanya | ............. | H04L 63/145 |
| | | | | 726/23 |
| 2015/0347741 A1* | 12/2015 | Krstic | ..................... | G06F 21/32 |
| | | | | 726/19 |
| 2016/0378991 A1* | 12/2016 | Sedayao | ................. | G06F 21/575 |
| | | | | 713/2 |

OTHER PUBLICATIONS

David McMillen, "Indicators of Compromise", IBM Security Services Research Report, Jun. 2015, Retrieved from the Internet: <URL: https://pcatt.org/techblog/wp-content/uploads/2015/10/IndicatorsOfCompromise.pdf>, See p. 5; 8 pages.

International Preliminary Report on Patentability dated Apr. 24, 2018 in International Patent Application No. PCT/US2016/052586.

McMillen, David, "Indicators of Compromise", In IBM Security Services Research Report, Jun. 2015.

* cited by examiner

END-POINT VISIBILITY

CROSS-REFERENCE TO RELATED APPLICATIONS

This application claims priority from U.S. Provisional Application No. 62/245,139 filed Oct. 22, 2015, entitled "End-Point Visibility," the contents of which is incorporated herein by reference.

TECHNICAL FIELD

The present disclosure pertains to the field of electronic device security and, more particularly, to a system and method for end-point visibility and remediation.

DESCRIPTION OF RELATED ART

When compromised, electronic content might be restored to servers, computers, and other machines. Attempts to recover and restore electronic content may include reimaging each such machine. The attempts to recover and restore electronic content may be made from centralized servers or machines. The centralized servers or machines themselves may be compromised and restoration of client machines may be performed by hand. The restoration effort for many different clients may share network bandwidth. Some restoration may be performed offline, without taking advantage of the network.

In the event of servers, computers, and other machines compromised with malware running with high privileges, visibility and remediation actions over those devices may not be reliable. Malware could be affecting visibility (hiding certain information) and/or preventing remediation.

BRIEF DESCRIPTION OF THE DRAWINGS

For a more complete understanding of embodiments of the present disclosure and its features and advantages, reference is now made to the following description, taken in conjunction with the accompanying drawings, in which.

DETAILED DESCRIPTION

Figure 1:
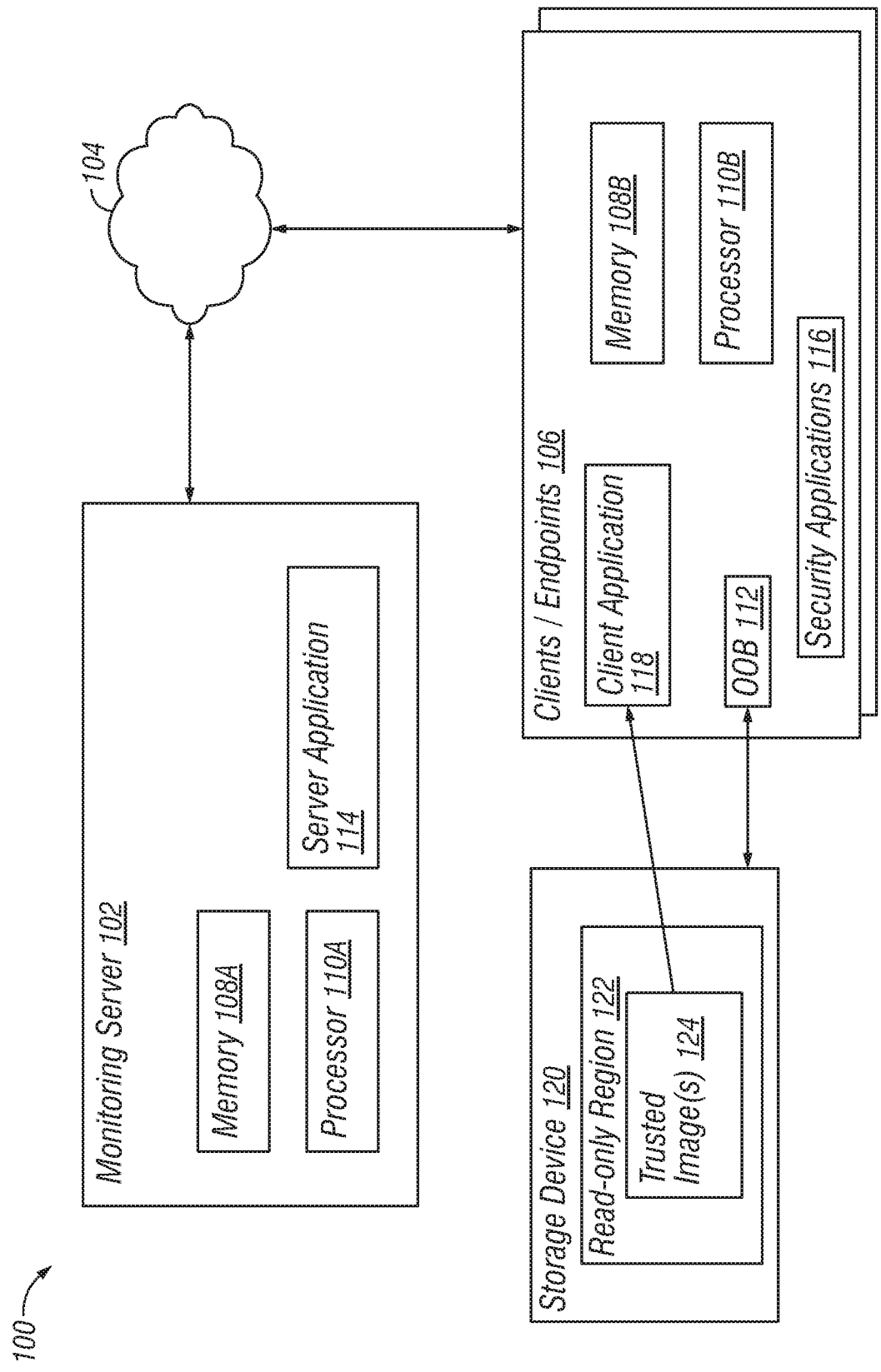
FIG. 1 is a block diagram illustrating an example embodiment of a system for endpoint visibility, according to embodiments of the present disclosure.

FIG. 1 is an example embodiment of a system 100 for end-point visibility, according to embodiments of the present disclosure. Endpoints 106 may include clients, client machines, thin clients, or virtual machines of a system. The visibility of such endpoints may include analysis of the security state of the endpoints. Incident responders using a server, such as monitoring server 102 or end-point orchestrator (EPO) may observe, detect and respond to security issues affecting groups of clients or endpoints 106 in system 100. Such incident responders may perform these functions in spite of potential operating system (OS) kernel problems due to malware on endpoints 106. System 100 may provide for reliable visibility in a hostile or malware-compromised environment by booting from a locally stored, trusted, hidden, protected image with an endpoint detection and response (EDR) tool.

Endpoint 106 and server 102 may be executed on any suitable server, blade, computer, electronic device, virtual machine, or other suitable apparatus. Endpoint 106 and server 102 may be communicatively coupled over a network 104. Furthermore, each of endpoint 106 and server 102 may include a memory 108 communicatively coupled to a processor 110. Endpoint 106 and server 102 as well as the components of endpoint 106 and server 102 described herein may be implemented by applications, scripts, drivers, firmware, code, application programming interfaces, functions, or other suitable elements. These components may include instructions within memory 108 for execution by processor 110. The instructions, when read and executed by processor 110, may cause the processor to perform the functionality of the elements of system 100 as described herein. Furthermore, although endpoint 106 and server 102 are described herein with particular functionality, some of such functionality may be performed by other suitable portions of system 100, such as the other one of endpoint 106 and server 102.

Server 102 may include any suitable number and kind of components. In one embodiment, server 102 may include a server application 114 to perform the functionality of server 102, such as monitoring and controlling parts of the operation of endpoints 106. Server application 114 may include an Active Response (AR) server application, endpoint threat detection and response application, or other suitable entity.

Endpoints 106 may include any suitable number and kind of components. In one embodiment, endpoints 106 may include a client application 118 to perform functionality of the endpoint with respect to end-point visibility. In one embodiment, instances of client application 118 may be operating on endpoint 106 within a typical operating system and environment. In another embodiment, instances of client application 118 may be executed as secure instances, wherein the client application instance is launched from a secured partition within endpoint 106. In such an embodiment, the secured instance of client application 118 may be operating within an environment that has been specially and securely booted through, for example, an out-of-band (OOB) channel such as Active Management Technology (AMT). Furthermore, endpoint 106 may include sensors or security applications 116, and an OOB module 112.

In one embodiment, client 106 may include or be communicatively coupled to a secured storage device 120. Storage device 120 may be implemented by, for example, a solid state disk. Storage device 120 may include a partition such as read-only region 112, which may protect content such as a trusted image or images 124. Image 124 may include, for example, a known or safe version of a client application, active response client, operating system, settings for execution, application installations, or a combination of these. Read-only region 112 may be protected against tampering by malware. In one embodiment, read-only region 112 might be inaccessible to software running on operating systems of endpoints 106.

Inspection of endpoint 106 may be performed to determine whether endpoint 106 is infected with malware or is otherwise compromised. Inspection can be automatically triggered by sensors on endpoints 106. Sensors on endpoints 106 may include security applications 116, such as anti-virus programs, host intrusion protection systems, McAfee Active Response sensors, or other suitable entities. Reliable inspection may be further be triggered by sensors outside of endpoints 106, such as by a web gateway, next-generation firewalls, etc. Furthermore, reliable inspection may be manually triggered by a centrally located administrator at server 102. Reliable inspection may be triggered by an out-of-band channel that cannot be interfered with or prevented by malware. Triggering may be originated by server 102, which triggers reliable inspection of endpoints 106 through the out-of-band channel. Inspection of endpoints 106 may be made independent of the main operating system therein, the state of the client machine therein, and may be guaranteed to provide true visibility to the state of file-system and registry therein, as well as remedial actions. Out-of-band operations may be performed without use of operating systems on endpoint 106.

Other solutions might require IT support staff to inspect machines by hand, one by one. Furthermore, automatic triggers might not be available for clients. IT support staff might be needed to initiate the inspection process. Furthermore, analysis of inspection results might not be centralized and comparisons between machines might not be easily performed.

In one embodiment, triggering of endpoints 106 may be performed automatically in response to an Incidence of Compromise (IoC) detected on a given endpoint. An IoC may include, for example, a malware finding, an anomaly in execution or network traffic, or other suspicious event. Thus, manual inspection and analysis might not be needed. An IoC may be detected from server 102 or endpoint 106 through any suitable security application or appliance, such as active response, Host Intrusion Protection (HIPS), Web gateways, firewalls, or data loss prevention (DLP). These may be configured by server 102 and server application 114.

In another embodiment, inspection may be initiated between server 102 and an endpoint 106 via an independent communication channel. Such a channel may include, for example, OOB module 112. OOB module 112 of endpoint 106 may be independent with respect to operating system, memory, processing, or power of the rest of endpoint 106.

In yet another embodiment, inspection may be performed from an independent, trusted, protected operating system image 124 with active response or client application 118. Image 124 might be stored in a read-only region, independent region, or secured region 122 of a storage device 120 available to or included within endpoint 106. Image 124 might not be accessible to other portions of endpoint 106. The partition or read-only region 122 may be referred to as a TSR region. Moreover, image 124 may be stored in a network shared drive or in a portable USB drive. In still another embodiment, the inspection operation may be centrally configurable and administered via a security console such as server 102.

As a result, system 100 may perform detection and correction that resists being prevented or fooled by malware on endpoints 106. In a further embodiment, system 1800 may avoid the need of a reboot for obtaining reliable endpoint information. This could be achieved by executing certain active response sensors directly using converged security and manageability engine for out-of-band visibility. In the same way that information may be obtained externally from an integrated senor hub through converged security and manageability engines, system 100 may obtain file system information including windows registries and certain sections of memory information remotely by using con-verged security and manageability engines coupled with OOB and dynamic application loaders to completely bypass the potentially infected operating system. Converged security and manageability engines may be modified for direct access to system resources to implement such a solution.

In operation, server application 114 may configure various endpoints 106 through client application 118 instances. The server and the endpoints' various security applications or sensors may be configured to monitor for various malicious activity.

On the event of a compromise of system 100 by malicious activity on one or more endpoints 106, the sensors may send notifications in real time over a communication fabric to server application 114 and server 102. Server application 114 may then send an out-of-band reboot command to affected endpoints 106. The command may include parameters that mark the operation type as 'reliable inspection and repair'.

OOB 112 components on a given endpoint 106 may receive this command. OOB 112 may force an out-of-band machine reboot for the given endpoint 106. The reboot may be based upon the availability of a trusted operating system image 124, whether located in a local secured drive or a network drive.

Upon the boot operation, the given endpoint 106 may be booted into a known and trusted operating system instance. The operating system instance may include a client application 118 instance that is installed and operating.

After boot, the instance of the operating system image may connect to server application 114. The instance of client application 118 may be authenticated and confirm that the reboot was successful. Client application 118 and server application 114 may perform real-time data inspection, collection, and reporting.

Once the inspection and repair operation is completed, the endpoint 106 may be rebooted into its main operating system. By running scanning and repair across multiple machines, users of server application 114 may run various types of searches as well as remediation actions from the central server 102 to groups of machines.

Server 102 may be implemented by, for example, a computer, blade server, mainframe, or other suitable electronic device. Endpoints 106 may be implemented by, for example, a computer, virtual machine, thin client, laptop, mobile device, tablet, or other suitable electronic device. Network 104 may be implemented by a cloud, intranet, private network, WLAN, LAN, VLAN, or other suitable networked configuration of electronic devices. Client application 118 and server application 114 may be implemented by, for example, a module, executable, script, application, function, application programming interface, code, or other suitable entity. Although a client application 118 and server application 114 are shown, these may be implemented by multiple such entities in communication with each other. Client application 118 and server application 114 may be implemented by instructions in a memory 108 for execution by a processor 110. The instructions, when loaded and executed by processor 110, may perform the functionality of client application 118 and server application 114 described in this disclosure.

DLP may identify patterns of data exposure. DLP may further categorize data according to the contents or metainformation of data. For example, DLP may scan data and find presentation slides marked as "confidential" and raise an indicator or quantification of the sensitivity of the data. Intrusion protection systems may identify network or other inbound traffic, determine patterns or characteristics of the behavior, and detriment that the inbound traffic is an intrusion and is malicious. EPO software may provide console information to an administrator of system 100. Active response or client application 118, whether installed in a server or locally on clients, may mine clients for information about indicators of attack or other triggers that signify malware.

Memory 108 may be in the form of physical memory or pages of virtualized memory. Processor 110 may comprise, for example, a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in memory. Memory may be configured in part or whole as application memory, system memory, or both. Memory may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of the system may reside in memory for execution by the processor.

Figure 2:
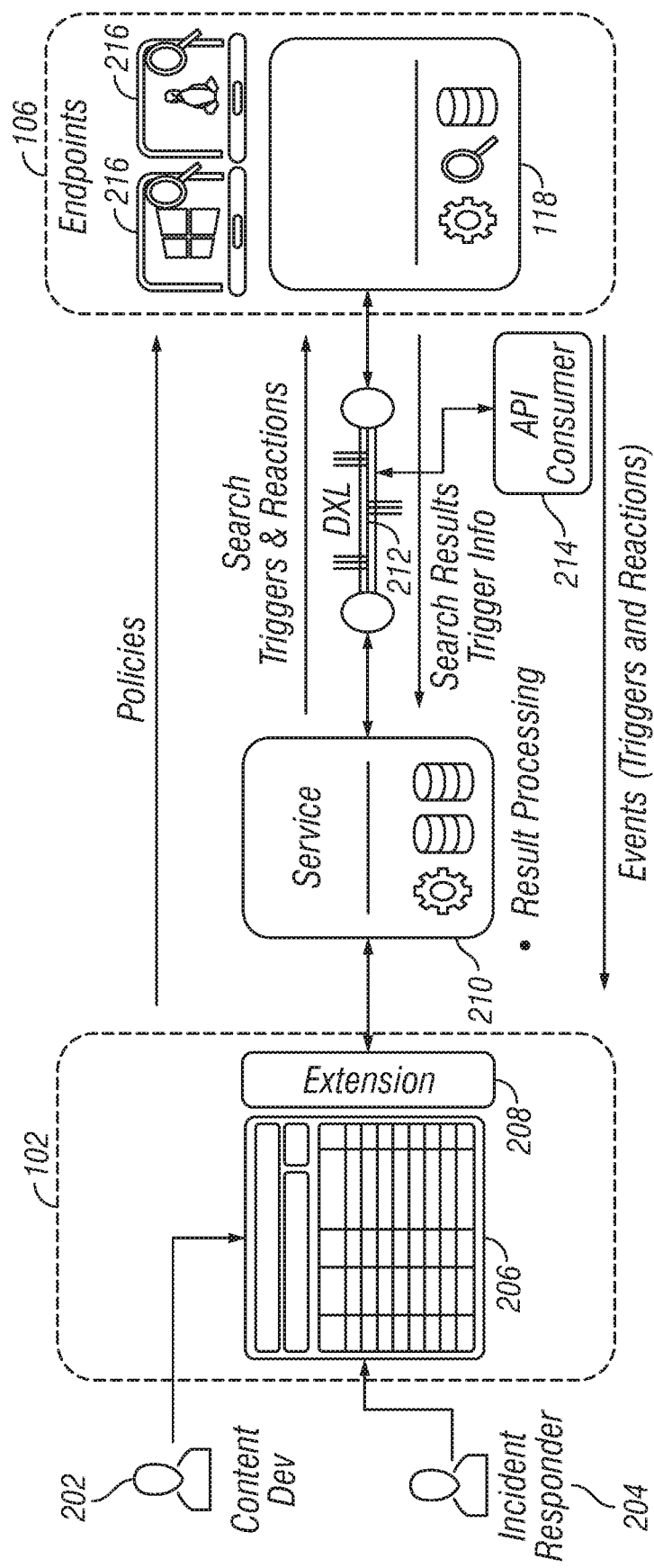
FIG. 2 is a more detailed illustration of elements of a system for end-point visibility, according to embodiments of the present disclosure.

Processor 110 may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, microinstructions, or control signals which reflect the original code instruction. The processor may also include register renaming logic and scheduling logic, which generally allocate resources and queue the operation corresponding to the convert instruction for execution. After completion of execution of the operations specified by the code instructions, back end logic within the processor may retire the instruction. In one embodiment, the processor may allow out of order execution but requires in order retirement of instructions. Retirement logic within the processor may take a variety of forms as known to those of skill in the art (e.g., re-order buffers or the like). The processor cores of the processor are thus transformed during execution of the code, at least in terms of the output generated by the decoder, the hardware registers and tables utilized by the register renaming logic, and any registers modified by the execution logic FIG. 2 is an illustration of example operation and configuration of the system 100 in further detail, according to embodiments of the present disclosure.

Server 102 may include a graphical user interface (GUI) 206 for the server. GUI 206 may include an interface for specifying various settings for client applications and security applications running on endpoints 216. The specifications may be made by a developer 202 or other administrator of system 100. Furthermore, the GUI may be accessed by an incident responder 204 or other administrator of system 100 upon notification that problems may have arisen in the system. Server 102 may include extensions, such as application programming interfaces, remote procedure calls, or other suitable interfaces for the server such that a service may be provided to the endpoints. For example, server 102 may be accessed by client application 118 through extension 208.

Security applications on endpoint 106 may scan or monitor execution thereon, and, when malicious behavior is detected, provide notifications to server 102. Subsequently, client application 118 may be booted and accessed.

Server 102 may issue policies to the endpoints, which may scan operation, contents, and behavior (shown as 216) through the security applications. Upon identifying an IOC, the security applications may return server events, health check triggers 302, or reactions to server 102. Server 102 may perform processing of these results and query endpoints 106. Server 102 may log information that has been received, both from the security applications and from subsequent queries of endpoints 106. server 102 through use of extension 208 may perform a service 210

Service 210 may issue requests to and from endpoint 106 through a data exchange layer (DXL) 212. Service 210 may issue requests to endpoint 106 that generated triggers, or to other endpoints 106 that have been determined to be associated with the endpoint 106 that generated the trigger. Such an association may include, for example, endpoints 106 that accessed websites that were also accessed by the endpoint that generated the trigger. Service 210 may access endpoints 106 through an application programming interface 214 of client application 118. The requests may include searches about the original triggers and reactions, or about other IoCs. The search results and trigger information may be returned through service 210 to server 102.

The additional requests of endpoint 106 may include queries or other requests for additional monitoring information. The additional information may be queried based upon cross-referencing information from endpoint 106 with other data reported from other endpoints. For example, network activity from endpoint 106 might be cross-referenced with network activity from other endpoints. Files from other endpoints accessing the same websites as endpoint 106 might be examined. Endpoint 106 might be searched for such files.

Figure 3:
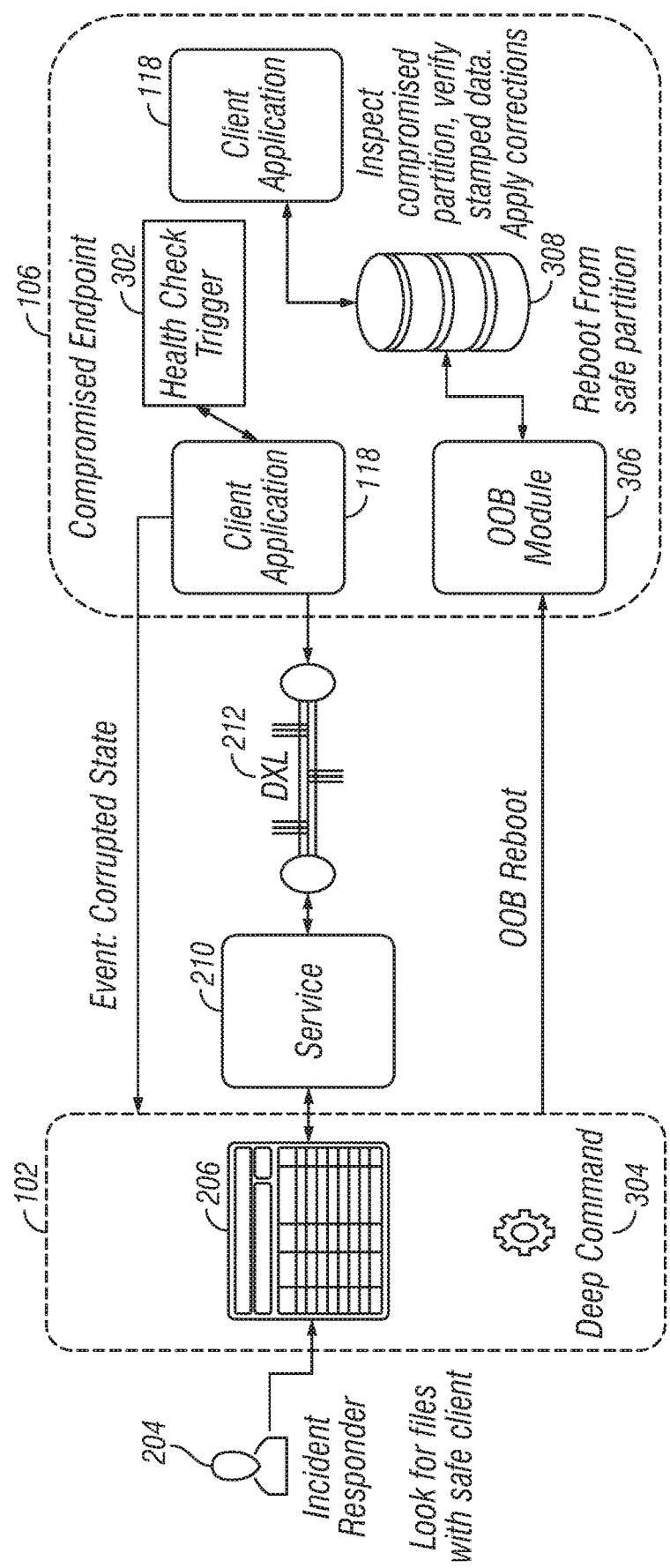
FIG. 3 is a more detailed illustration of operation of a system for end-point visibility, according to embodiments of the present disclosure.

FIG. 3 is an illustration of example operation and configuration of the system 100 in yet further detail, according to embodiments of the present disclosure. FIG. 3 may illustrate booting of client application 118 by service 210.

An administrator, such as an incident responder 204, may look for files with a safe client application 118 instance, or the capability of booting to such a safe client application 118 instance. The administrator may use an OOB, AMT or deep command 304 to contact an OOB, AMT application programming interface, or module 306 on an endpoint 106 that has been compromised by malware. Endpoint 106 may be rebooted from a secured image in storage 308. Client application 118 may be booted. Partition 308 may be inspected to make sure that client application 118 is correct and can be used. Client application 118 may check trigger information or other data from endpoint 106 and report it to server 102. The corrupted state of endpoint 106 may be reported.

Thus, system 100 may include collectors, which may include components responsible for getting system information of a given domain. The information may include file, network, or process information. A collector may have name and a set of outputs. System 100 may include search mechanisms by which server 102 may provide immediate system visibility. A combination of collectors may be specified by users to identify the information that will be retrieved as well as filtering criteria. System 100 may include triggers or other suitable mechanisms for continuous endpoint sensing by capturing system events. Once enabled, the triggers keep watching certain system events and evaluating a condition. The system may include reaction components for acting upon a fired trigger. The end user may also be able to apply reactions upon search results.

Server 102 may perform threat search, active response search, out of the box collection and reactions, create custom collectors, create custom reactions, configure triggers, and execute reactions. Endpoints 106 may perform data collection, execute persistent collectors based upon, for example, network flow or files (with hash), and respond to the query engine.

Figure 4:
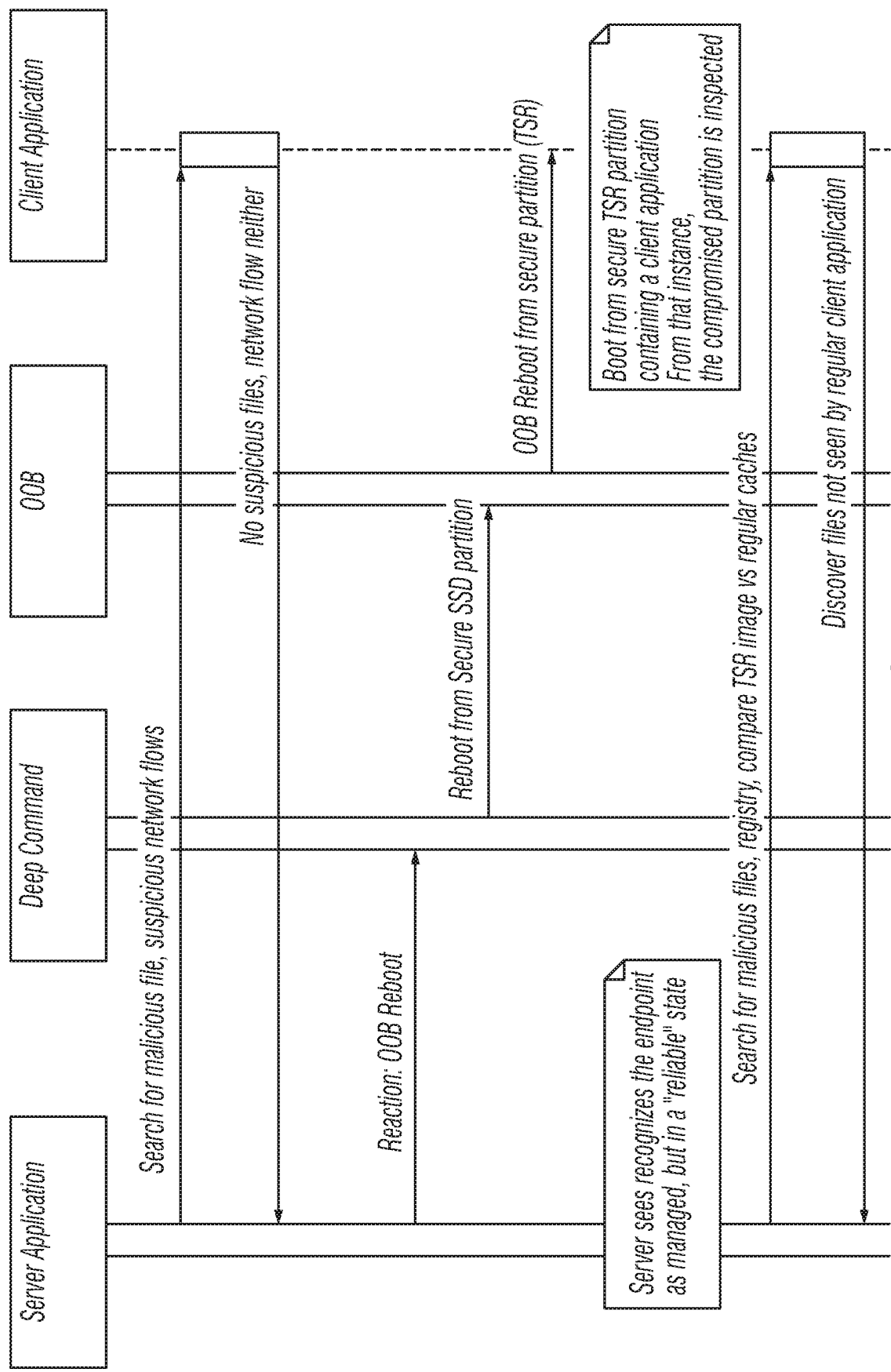
FIG. 4 is a flow diagram of operation of a system for end-point visibility, according to embodiments of the present disclosure.

FIG. 4 is a flow diagram of operation of a system for end-point visibility, according to embodiments of the present disclosure.

A server application or EPO application may search for malicious files, suspicious network flows, or other IoCs on an endpoint. The search may be directly performed by the server-based applications, or may be caused to execute on the endpoint by a configuration by the server. If no IoCs are found, the system may continue operating. The search may be conducted on a periodic or continuous basis.

If an IoC has been determined, the server application may issue an out-of-band reboot command to the endpoint. The reboot command may be first issued through a deep command interface on the server. The reboot command may then be issued to a secured SSD partition on storage through an AMT or OOB call. The storage may be communicatively coupled or included within the endpoint. The OOB, AMT interface or module may cause the reboot to be performed from a secure partition.

Once the reboot has been performed, the endpoint may be booted from the secured partition wherein an active response or client application has been launched. From this instance of the active response or client application, the IoC may be analyzed. This may include inspecting another partition of the storage from which the IoC was analyzed.

The server application may recognize that the endpoint is now in a managed but reliable state. The server application may issue additional commands for corrective action. This may include a search for malicious files, registry values or changes, or evaluating the secured partition's version of the active response or client application against stored copies elsewhere on the endpoint. These searches may be in addition to, and may exceed, the searches and analysis performed by the active response or client application. The results may be returned to the server.

Figure 5:
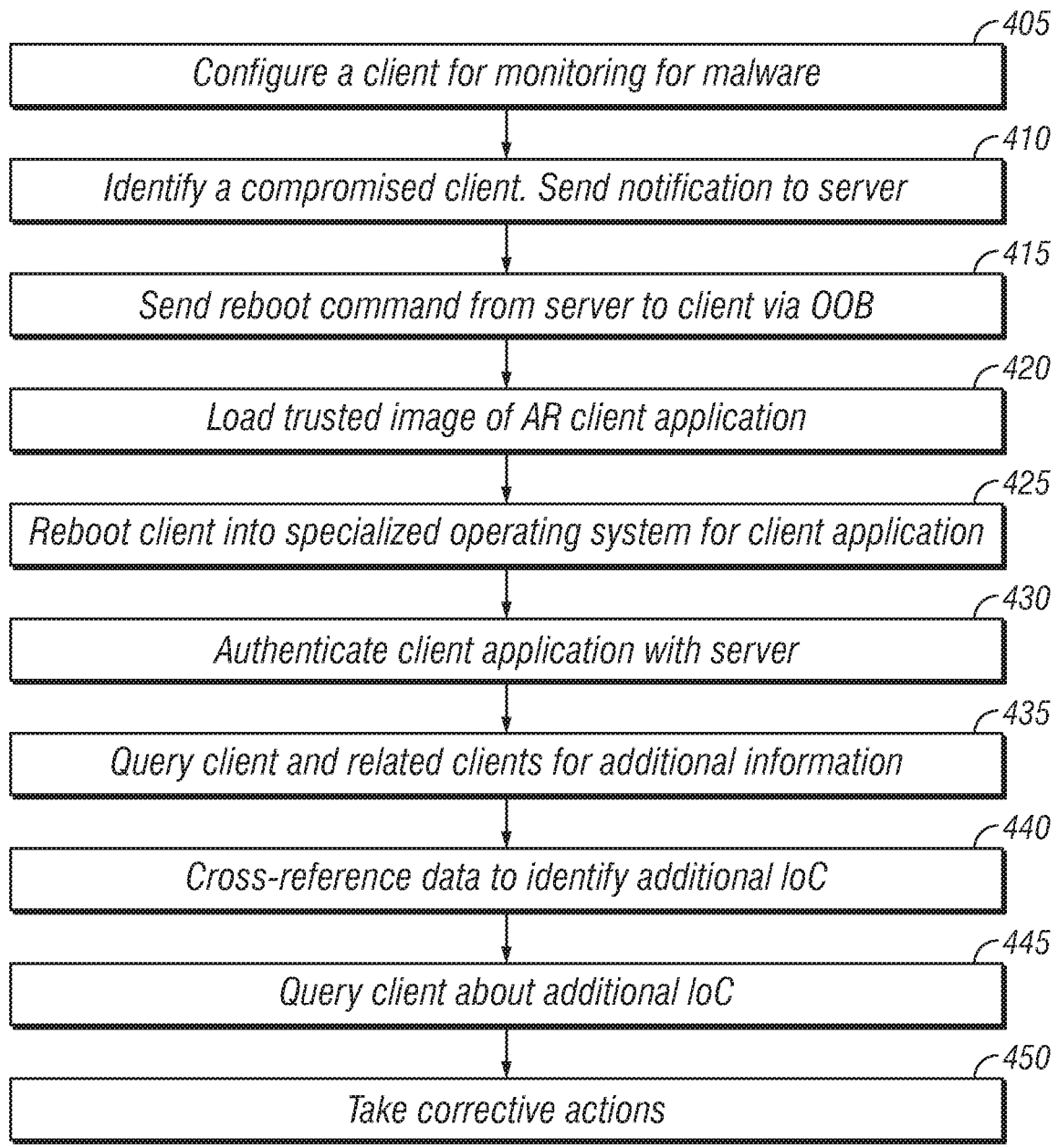
FIG. 5 is a flow diagram illustrating an example embodiment of a method for endpoint visibility, according to embodiments of the present disclosure.

FIG. 5 is a flow diagram illustrating an example embodiment of a method 400 for endpoint visibility, according to embodiments of the present disclosure.

Method 400 may be implemented by any of the elements of FIGS. 1-4 shown above. For example, various portions of method 400 may be performed by storage device 120, endpoint 106, or server 102. The steps of method 400 may begin at any suitable point, including 405. Furthermore, the steps of method 400 may be optionally repeated, looped, recursively executed, executed in various order, or omitted as necessary. Different steps of method 300 may be executed in parallel with other steps of method 400. In additional, further steps may be executed during execution of method 400, wherein such further steps are not shown in FIG. 4 but are described with respect to FIGS. 1-4 or would be apparent to one of skill. Execution of method 400 may be performed entirely or in part by execution of instructions from a memory by a processor.

At 405, clients in a network may be configured to monitor for anomalies, malware, or IoCs. The clients may be configured from a central server.

At 410, a client may be compromised. The client may be identified as compromised by sensors operating on the client. The client may send a notification to the server. The notification might be sent in an out-of-band manner.

At 415, the server may begin to take corrective or remedial actions. The server may issue a reboot command to the client. The reboot command may specify that a special partition holding a trusted image of a client application is to be used, or combination of the application and operating system is to be used. The reboot command may be sent via OOB or AMT channels.

At 420, secured storage may be accessed to load a trusted image of the client application. The secured storage may require authorization to be accessed. For example, public-private keys may be exchanged and verified. The trusted image of the client application may be loaded from storage.

At 425, the client may be rebooted. The client may be rebooted into a specialized environment for the client application. The client application may execute outside, or out-of-band, of the operating system in which the IoC was determined.

At 430, the instance of the client application may be authenticated. The instance may be authenticated using a hash of the client application installation. The authentication may be made using a public-private key pair. The authentication may be made with the server. The authentication may be made through an OOB or AMT channel.

At 435, the server may query other clients based upon the IoC. For example, if the IoC involved a file or website, the server may query other clients to determine if the other clients had encountered the same file or website. In another example, the server may query other clients that had communicated with the client that generated the IoC. The server may query the compromised client to obtain additional information as well.

At 440, the data returned from the queries may be cross-referenced to identify additional IoCs. At 445, the clients may be queried for additional information about the new IoC. 440 and 445 may repeat for as many IoCs are found, At 450, additional corrective action, such as quarantine, patches, or other preventative measures may be taken with respect to the determined IoCs.

Method 400 may optionally repeat at any part of method 400 or terminate.

Embodiments of the present disclosure include at least one non-transitory machine readable storage medium. The medium may include computer-executable instructions carried on the machine readable medium. The instructions may be readable by a processor. The instructions, when read and executed, may cause the processor to receive an indication that a client has been affected by malware, boot the client or cause booting from a trusted operating system image, launch or cause launching of a secured security application on the client from a trusted application image, and analyze a malware status of the client through the secured security application. In combination with any of the above embodiments, the processor may be caused to boot the client or cause booting of the client through a secured module on the client. In combination with any of the above embodiments, the processor may be caused to boot the client or cause booting of the client through a secured module on the client with a communications channel independent of operating systems of the client. In combination with any of the above embodiments, the processor may be caused to monitor for malware or cause monitoring to generate the indication that the client has been affected by malware. In combination with any of the above embodiments, the processor may be caused to boot or cause the booting of the client from the trusted operating system image from a read-only region of a secured storage device communicatively coupled to the client. In combination with any of the above embodiments, the processor may be caused to query or cause the querying of the secured security application on the client regarding additional indicators of compromise. In combination with any of the above embodiments, the processor may be caused to cross-reference the indication that the client has been affected by malware with other logged data to determine an additional indicator of compromise. In combination with any of the above embodiments, the processor may be caused to query the client to determine whether the client is associated with the additional indicator of compromise.

Embodiments of the present disclosure include a system for securing electronic devices. The system may include a processor, at least one non-transitory machine readable storage medium communicatively coupled to the processor, and a monitoring application comprising computer-executable instructions on the medium. The instructions may be readable by the processor. The monitoring application may be configured to receive an indication that a client has been affected by malware, boot or cause booting of the client from a trusted operating system image, launch or cause launching of a secured security application on the client from a trusted application image, and analyze a malware status of the client through the secured security application. In combination with any of the above embodiments, the application may be configured to boot or cause booting of the client through a secured module on the client. In combination with any of the above embodiments, the application may be configured to boot or cause booting of the client through a secured module on the client with a communications channel independent of operating systems of the client. In combination with any of the above embodiments, the application may be configured to monitor or causing monitoring for malware to generate the indication that the client has been affected by malware. In combination with any of the above embodiments, the application may be configured to boot or cause booting of the client from the trusted operating system image from a read-only region of a secured storage device communicatively coupled to the client. In combination with any of the above embodiments, the application may be configured to query or cause querying of the secured security application on the client regarding additional indicators of compromise. In combination with any of the above embodiments, the application may be configured to cross-reference the indication that the client has been affected by malware with other logged data to determine an additional indicator of compromise. In combination with any of the above embodiments, the application may be configured to query the client to determine whether the client is associated with the additional indicator of compromise.

Embodiments of the present disclosure include a method of electronic device security. The method may include receiving an indication that a client has been affected by malware, booting or causing booting of the client from a trusted operating system image, launching or causing launching a secured security application on the client from a trusted application image, and analyzing a malware status of the client through the secured security application. In combination with any of the above embodiments, the method may include booting or causing booting of the client through a secured module on the client. In combination with any of the above embodiments, the method may include booting or causing booting of the client through a secured module on the client with a communications channel independent of operating systems of the client. In combination with any of the above embodiments, the method may include configuring or causing configuring of the client to monitor for malware to generate the indication that the client has been affected by malware. In combination with any of the above embodiments, the method may include booting or causing booting of the client from the trusted operating system image from a read-only region of a secured storage device communicatively coupled to the client. In combination with any of the above embodiments, the method may include querying the secured security application on the client regarding additional indicators of compromise. In combination with any of the above embodiments, the method may include cross-referencing the indication that the client has been affected by malware with other logged data to determine an additional indicator of compromise. In combination with any of the above embodiments, the method may include querying the client to determine whether the client is associated with the additional indicator of compromise.

Embodiments of the present disclosure include an apparatus of electronic device security. The apparatus may include means for receiving an indication that a client has been affected by malware, means for booting the client from a trusted operating system image, means for launching a secured security application on the client from a trusted application image, and means for analyzing a malware status of the client through the secured security application. In combination with any of the above embodiments, the apparatus may include means for booting the client through a secured module on the client. In combination with any of the above embodiments, the apparatus may include means for booting the client through a secured module on the client with a communications channel independent of operating systems of the client. In combination with any of the above embodiments, the apparatus may include means for configuring the client to monitor for malware to generate the indication that the client has been affected by malware. In combination with any of the above embodiments, the apparatus may include means for booting the client from the trusted operating system image from a read-only region of a secured storage device communicatively coupled to the client. In combination with any of the above embodiments, the apparatus may include means for querying the secured security application on the client regarding additional indicators of compromise. In combination with any of the above embodiments, the apparatus may include means for cross-referencing the indication that the client has been affected by malware with other logged data to determine an additional indicator of compromise. In combination with any of the above embodiments, the apparatus may include means for querying the client to determine whether the client is associated with the additional indicator of compromise.

Program instructions may be used to cause a general-purpose or special-purpose processing system that is programmed with the instructions to perform the operations described above. The operations may be performed by specific hardware components that contain hardwired logic for performing the operations, or by any combination of programmed computer components and custom hardware components. Methods may be provided as a computer program product that may include one or more machine readable media having stored thereon instructions that may be used to program a processing system or other electronic device to perform the methods. The terms "machine readable medium" or "computer readable medium" used herein shall include any medium that is capable of storing or encoding a sequence of instructions for execution by the machine and that cause the machine to perform any one of the methods described herein. The term "machine readable medium" shall accordingly include, but not be limited to, memories such as solid-state memories, optical and magnetic disks. Furthermore, it is common in the art to speak of software, in one form or another (e.g., program, procedure, process, application, module, logic, and so on), as taking an action or causing a result. Such expressions are merely a shorthand way of stating that the execution of the software by a processing system causes the processor to perform an action or produce a result.

Although the present disclosure has been described in detail, it should be understood that various changes, substitutions, and alterations can be made hereto without departing from the spirit and the scope of the disclosure as defined by the appended claims.

What is claimed is:

1. At least one non-transitory machine-readable storage medium, comprising computer-executable instructions carried on the machine-readable medium, the instructions readable by a hardware processor, the instructions, when read and executed, for causing the hardware processor to:
monitor a plurality of clients for incidences of compromise; and
upon detecting an incidence of compromise on one or more of the plurality of clients, for each client:
receive an indication that the client, that is a computer that is separate from the hardware processor and that is coupled to the hardware processor using a computer network, has been affected by malware;
cause the client to be booted from a trusted operating system image;
in response to the client being rebooted from the trusted operating system image:
cause a secured security application to be launched on the client from a trusted application image; and
cause a malware status of the client to be analyzed through the secured security application to evaluate a cause of the incidence of compromise on the client;
cross-reference the indication that the client has been affected by malware with other lowed data to determine an additional indicator of compromise; and
query the client to determine whether the client is associated with the additional indicator of compromise.

2. The medium of claim 1, further comprising instructions for causing the client to be booted through a secured module on the client.

3. The medium of claim 1, further comprising instructions for causing the client to be booted through a secured module on the client with a communications channel independent of operating systems of the client.

4. The medium of claim 1, further comprising instructions for causing the client to be configured to monitor for malware to generate the indication that the client has been affected by malware.

5. The medium of claim 1, further comprising instructions for causing the client to be booted from the trusted operating system image from a read-only region of a secured storage device communicatively coupled to the client.

6. The medium of claim 1, further comprising instructions for causing the secured security application on the client to be queried regarding additional indicators of compromise.

7. A system for securing electronic devices, comprising:
a hardware processor;
at least one non-transitory machine-readable storage medium communicatively coupled to the hardware processor; and
a monitoring application comprising computer-executable instructions on the medium, the instructions readable by the hardware processor, the monitoring application configured to:
monitor a plurality of clients for incidences of compromise; and
upon detecting an incidence of compromise on one or more of the plurality of clients, for each client:
receive an indication that the client, that is a computer that is separate from the hardware processor and that is coupled to the hardware processor using a computer network, has been affected by malware;
cause the client to be booted from a trusted operating system image;
in response to the client being rebooted from the trusted operating system image:
cause the client to launch a secured security application from a trusted application image; and
cause malware status of the client to be analyzed through the secured security application to evaluate a cause of the incidence of compromise on the client;
cross-reference the indication that the client has been affected by malware with other lowed data to determine an additional indicator of compromise; and
query the client to determine whether the client is associated with the additional indicator of compromise.

8. The system of claim 7, wherein the monitoring application is further configured to cause the client to be booted through a secured module on the client.

9. The system of claim 7, wherein the monitoring application is further configured to cause the client to be booted through a secured module on the client with a communications channel independent of operating systems of the client.

10. The system of claim 7, wherein the monitoring application is further configured to configure the client to monitor for malware to generate the indication that the client has been affected by malware.

11. The system of claim 7, wherein the monitoring application is further configured to cause the client to be booted from the trusted operating system image from a read-only region of a secured storage device communicatively coupled to the client.

12. The system of claim 7, wherein the monitoring application is further configured to query the secured security application on the client regarding additional indicators of compromise.

13. A method of electronic device security, comprising:
monitoring a plurality of clients for incidences of compromise; and
upon detecting an incidence of compromise on one or more of the plurality of clients, for each client:
receiving at a hardware processor an indication that the client, that is a computer that is separate from the hardware processor and that is coupled to the hardware processor using a computer network, has been affected by malware;
causing the client to boot from a trusted operating system image using the hardware processor;
in response to the client being rebooted from the trusted operating system image:

causing a launch of a secured security application on the client from a trusted application image using the hardware processor; and analyzing a malware status of the client through the secured security application using the hardware processor to evaluate a cause of the incidence of compromise on the client;

cross-referencing the indication that the client has been affected by malware with other logged data to determine an additional indicator of compromise; and querying the client to determine whether the client is associated with the additional indicator of compromise.

14. The method of claim 13, further comprising causing the client to boot through a secured module on the client.

15. The method of claim 13, further comprising causing the client to boot through a secured module on the client with a communications channel independent of operating systems of the client.

16. The method of claim 13, further comprising configuring the client to monitor for malware to generate the indication that the client has been affected by malware.

17. The method of claim 13, further comprising causing the client to boot from the trusted operating system image from a read-only region of a secured storage device communicatively coupled to the client.

* * * * *

UNITED STATES PATENT AND TRADEMARK OFFICE
CERTIFICATE OF CORRECTION

PATENT NO. : 10,546,131 B2
APPLICATION NO. : 15/089021
DATED : January 28, 2020
INVENTOR(S) : Dmitri Rubakha et al.

It is certified that error appears in the above-identified patent and that said Letters Patent is hereby corrected as shown below:

In the Claims

Column 11, Claim 1, Line 45:
"affected by malware with other lowed data"
Should be:
--affected by malware with other logged data--

Column 12, Claim 7, Line 29:
"affected by malware with other lowed data"
Should be:
--affected by malware with other logged data--

Signed and Sealed this
Fifth Day of March, 2024

Katherine Kelly Vidal
*Director of the United States Patent and Trademark Office*